United States Patent
Yamaguchi et al.

(10) Patent No.: US 6,914,209 B2
(45) Date of Patent: Jul. 5, 2005

(54) PLASMA ARC MACHINING METHOD

(75) Inventors: Yoshihiro Yamaguchi, Kaga (JP); Tetsuya Kabata, Kaga (JP); Takahiro Iriyama, Komatsu (JP)

(73) Assignee: Komatsu Industries Corporation, Tokyo (JP)

( * ) Notice: Subject to any disclaimer, the term of this patent is extended or adjusted under 35 U.S.C. 154(b) by 0 days.

(21) Appl. No.: 10/733,490

(22) Filed: Dec. 10, 2003

(65) Prior Publication Data

US 2004/0129687 A1 Jul. 8, 2004

(30) Foreign Application Priority Data

Dec. 17, 2002 (JP) .................................. 2002-364766

(51) Int. Cl.[7] .............................................. B23K 10/00
(52) U.S. Cl. ......................... 219/121.44; 219/121.54; 219/121.56; 219/121.48; 219/121.39
(58) Field of Search ................. 219/121.39, 121.44, 219/121.54, 121.56, 121.48, 121.36, 75, 137 R

(56) References Cited

U.S. PATENT DOCUMENTS 5,288,970 A * 2/1994 Nishi ..................... 219/121.56
5,416,297 A * 5/1995 Luo et al. ............... 219/121.57
5,614,110 A * 3/1997 Shintani et al. ......... 219/121.44

FOREIGN PATENT DOCUMENTS

JP  2000-351076 A  12/2000
JP  2003-225768 A  8/2003

* cited by examiner

Primary Examiner—Mark Paschall
(74) Attorney, Agent, or Firm—Frishauf, Holtz, Goodman & Chick, P.C.

(57) ABSTRACT

Not only damage to a nozzle caused by spatter generated during piercing is prevented but also the deterioration of the nozzle owing to a pilot arc is restrained, whereby the service life of the nozzle is significantly increased. To this end, the plasma torch is positioned at an initial level which is the distance between the plasma torch and a steel plate when generating a plasma arc to start piercing operation and which has been set equal to a cutting level which is the distance between the plasma torch and the steel plate when carrying out cutting operation. After generation of the plasma arc, the plasma torch is immediately raised to a piercing level which is more distant from the steel plate W than the initial level and piercing operation is performed at the piercing level. After completion of the piercing operation, the plasma torch is lowered to the cutting level to start cutting operation. Just after transfer from a pilot arc into a main arc, a pilot current is cut off by turning a transistor off.

2 Claims, 5 Drawing Sheets

3(a) TORCH IS MOVED TO INITIAL LEVEL

3(b) ARC IGNITION → PIERCING STARTS

3(c) TORCH IS RAISED AFTER START OF PIERCING

3(d) TORCH IS LOWERED TO CUTTING LEVEL TO START CUTTING OPERATION AFTER FORMATION OF THROUGH HOLE

FIG.2
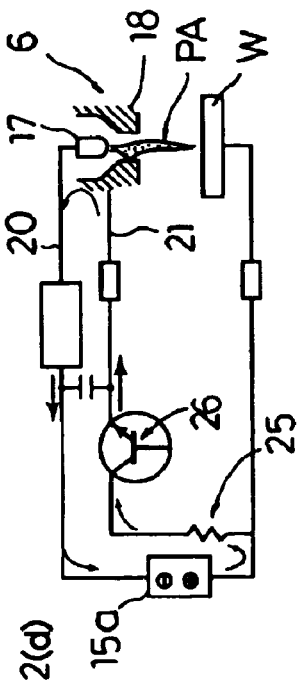
2(a)
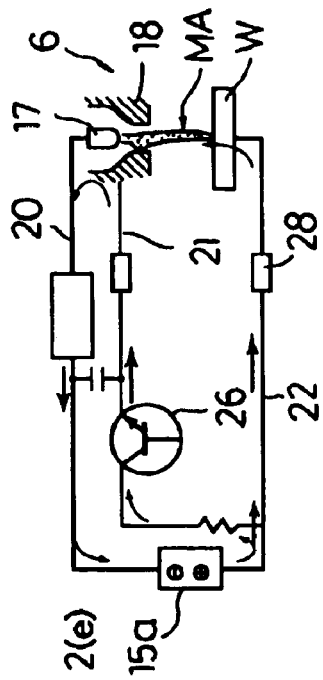
2(b)
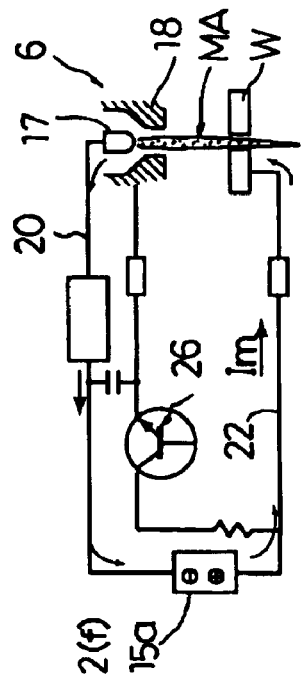
2(c)
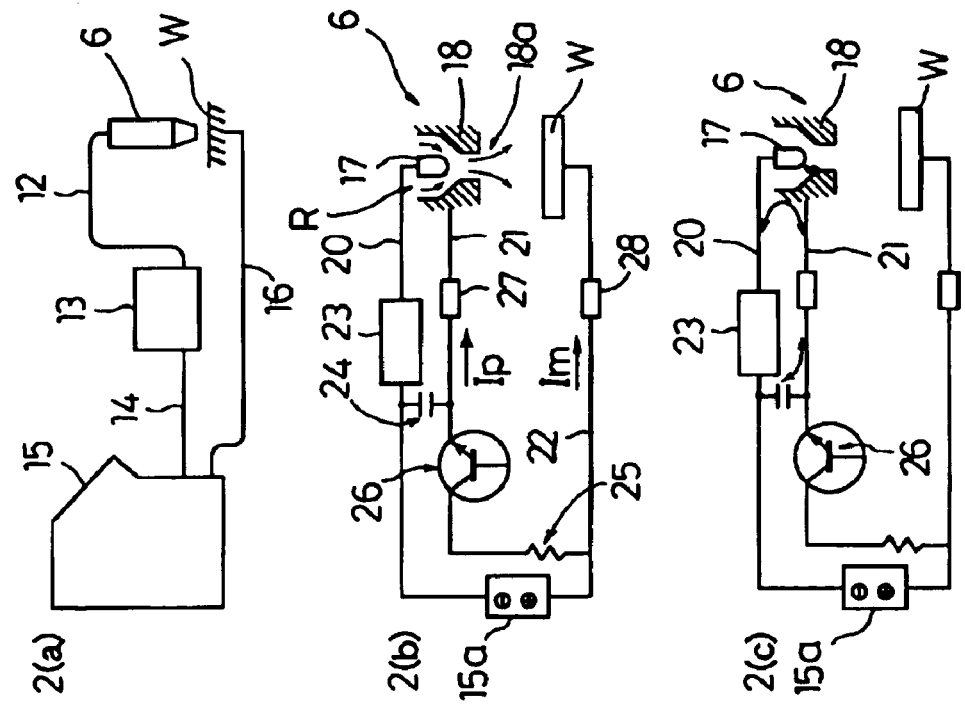
2(d)
2(e)
2(f)

FIG. 4
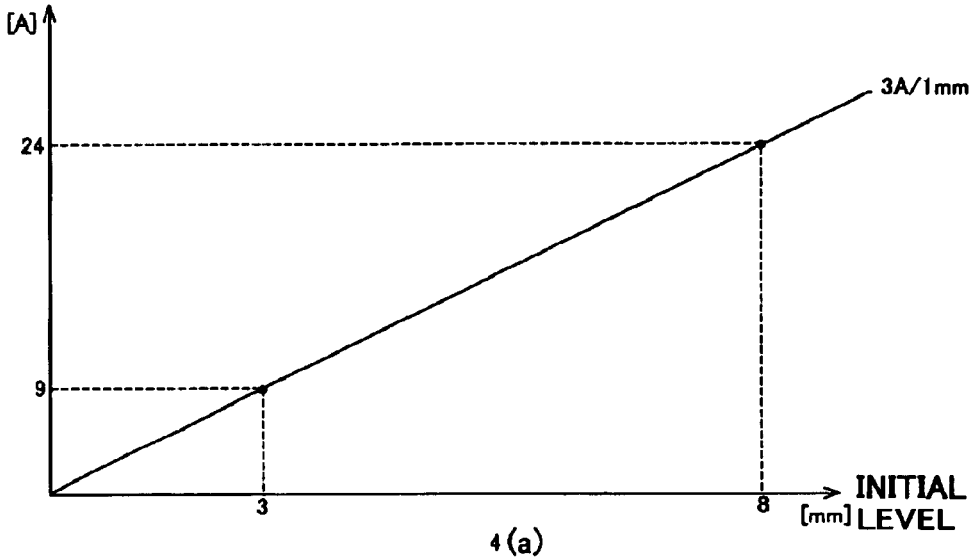
4(a)
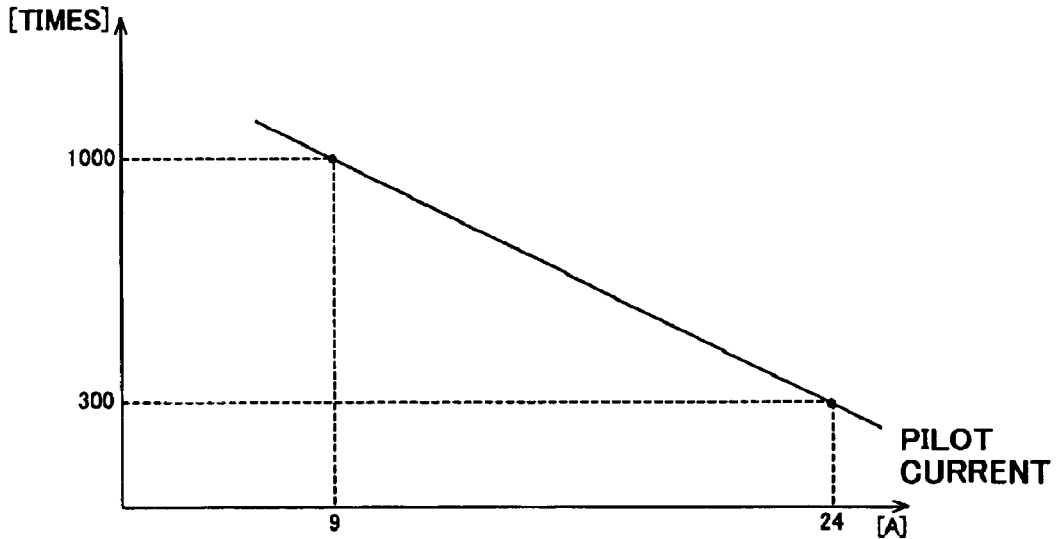
4(b)

PLASMA ARC MACHINING METHOD

TECHNICAL FIELD

The present invention relates to a plasma arc machining method for performing piercing and cutting by use of a plasma arc generated from a plasma torch, and more particularly to a plasma arc machining method including a piercing operation that makes it possible to improve the service life of the nozzle of the plasma torch.

BACKGROUND ART

Plasma arc machining method utilizing the high density heat of a physically, electrically converged plasma column has been widely practically used since it enables high-precision, high-efficiency cutting. In plasma arc machining method, cutting is usually performed by generating a plasma arc from a plasma torch and moving the plasma torch while stably maintaining the plasma arc.

The plasma torch has an electrode and a nozzle disposed so as to enclose the electrode, and a plasma gas is jetted to an object material through a path defined by the electrode and the nozzle. For cutting an object material with the plasma torch, a pilot arc is first generated between the electrode and the nozzle and is then grown into a main arc, whereby a plasma arc having high temperature and high-density energy is established between the electrode and the object material.

There are generally known two ways of cutting a steel plate, for instance, into various shapes with a plasma arc generated from the plasma torch. In one method, cutting is started from an end of a steel plate. Another method is such that a through hole is formed at a desired position of a steel plate and cutting is started from the through hole. The latter method is called "piercing start" and prevailing in the field of automatic cutting by use of an NC device because a workpiece of a desired shape can be cut out of a steel plate with this method.

In cases where a steel plate is cut by the piercing start, during piercing operation in which a through hole is made at a cutting start position by a plasma arc, the metal melted by the plasma arc is blown up in the form of spatter (molten metal droplets) and this blown spatter is likely to adhere to the nozzle. The spatter adhered to the nozzle could be a cause of melting-damage to the nozzle or occurrence of a double arc, which gives damage to the nozzle, resulting in a considerable decrease in cutting quality.

As an attempt to avoid such damage to the nozzle caused by spatter, there has been generally used a piecing technique as illustrated in FIG. 5(a) (① to ④) to According to this technique, a plasma torch 51 is first moved to a level $h_1$ that is the highest possible position for ignition of a steel plate W by a plasma arc (①) and piercing is carried out at the level $h_1$ (② to ③). After the piecing is completed and therefore blowing-up of spatter is ceased, the plasma torch 51 is lowered to a level $h_2$ suited for cutting operation and then, cutting is started (④). A piercing method improved over the above conventional technique has been proposed in Japanese Patent Kokai Publication No. 2000-351076. The piercing method (hereinafter referred to as "raising piercing method") disclosed in Publication No. 2000-351076 is carried out in the manner illustrated in FIG. 5(b) (① to ④). According to this, the plasma torch 51 is first moved to a level $H_1$ that is the upper limit position where ignition of a steel plate W by a plasma arc is possible and the steel plate W is ignited by the plasma arc at the level $H_1$ (① to ②).

At the same time that piercing starts, the plasma torch 51 is raised a specified distance to a level $H_2$ within the range that the plasma arc can be maintained in order to avoid damage to the nozzle caused by blowing-up of spatter, and then piercing is carried out at the level $H_2$ (③). After completion of the piercing operation, the plasma torch is lowered to a level $H_3$ suited for cutting operation and subsequently, cutting is started (④).

Where the level at which a plasma arc is first formed is defined as "initial level", the level at which piercing is carried out is defined as "piercing level", and the level at which cutting is carried out is defined as "cutting level", the initial level $h_1$ is equal to the piercing level and higher than the cutting level $h_2$ in the typical piercing method shown in FIG. 5(a). In the raising piercing method shown in FIG. 5(b), the initial level $H_1$ is lower than the piercing level $H_2$ and higher than the cutting level $H_3$.

Incidentally, damage to the nozzle is caused by not only adhering spatter described above but also the pilot arc. Specifically, since the pilot arc has high-density heat energy like the main arc, the longer the pilot arc is generated, the more the nozzle gets damaged by melting. A technique for solving such a problem is disclosed in Japanese Patent Application No. 2002-021284 that has been previously filed by the present applicant. The technique of this prior invention is such that switching between a pilot current circuit for forming a pilot arc and a main current circuit for forming a main arc is transistorized and an adequate resistor is inserted in the pilot current circuit, thereby transferring the pilot arc into the main arc at higher speed so that melting-damage to the nozzle caused by the pilot arc is restrained.

The above-described typical piercing method and raising piercing method can mange to avoid the damage to the nozzle caused by spatter generated during piercing but have revealed the problem that the pilot arc causes the nozzle to deteriorate. More specifically, in these piercing methods, since the initial level is set to a relatively high value (about twice the cutting level), (A) a higher pilot current becomes necessary when the pilot arc is grown into the main arc; and (B) the electric resistance of the discharge path between the electrode and the steel plate is extremely higher than that of the discharge path between the electrode and the nozzle and therefore, an influx of current into the nozzle is likely to occur, retarding the transfer of the pilot arc into the main arc. For the reasons (A) and (B), the nozzle is excessively melting-damaged by the pilot arc. In addition, setting of the initial level high brings about an arc ignition defect. It is necessary to set the pilot current high in view of (A), but if the pilot current cannot be properly adjusted and therefore remains low, the pilot arc becomes weak so that the pilot arc does not grow into the main arc, resulting in a failure in arc ignition. Although it is conceivable to fixedly set the pilot current to the highest possible value that the system can output in order to save labor in adjusting the pilot current, melting-damage to the nozzle caused by the pilot arc is promoted all the more in this case.

In the above-described technique associated with the prior invention, a nozzle deterioration preventing effect can be expected to some extent owing to the high-speed transfer of the pilot arc to the main arc, but there is still room for improvement because the initial level is set to a relatively high value (about twice the cutting level).

The present invention has been made taking account of the foregoing problems and situations, and a primary object of the invention is therefore to provide a plasma arc machining method capable of avoiding the damage to the nozzle caused by spatter generated during piercing and reliably restraining the deterioration of the nozzle caused by the pilot arc, whereby the service life of the nozzle is significantly improved.

DISCLOSURE OF THE INVENTION

The above object can be accomplished by a plasma arc machining method according to the invention in which a workpiece is pierced by a plasma arc and cutting is started from the position where piercing has been done, the method comprising:

(a) a first step of relatively moving a plasma torch to a workpiece piercing position, the plasma torch having an electrode for forming a plasma arc between the electrode and the workpiece and a nozzle for jetting a plasma gas which is a parent material of the plasma arc, and positioning the plasma torch at an initial level in relation to the workpiece, the initial level being equal to or substantially equal to a cutting level which is the distance between the plasma torch and the workpiece when carrying out cutting operation or being a level which is closer to the workpiece than the cutting level and at which a double arc does not occur;

(b) a second step of forming a main arc between the electrode and the workpiece, initiated by a pilot arc generated between the electrode and the nozzle thereby establishing a plasma arc after the positioning of the plasma torch, and relatively moving the plasma torch to a piercing level while maintaining the plasma arc, the piercing level being a level more distant from the workpiece than the initial level;

(c) a third step of maintaining the plasma arc with the plasma torch being stopped at the piercing level until piercing operation is completed; and (d) a fourth step of relatively moving the plasma torch to the cutting level to perform cutting operation after completion of the piercing operation.

According to the invention, the initial level, which is the distance between the workpiece and the plasma torch when forming a plasma arc between the workpiece and the electrode, is set, immediately before piercing, to a value equal to or substantially equal to the cutting level which is the distance between the plasma torch and the workpiece when performing cutting operation or to a value which is closer to the position of the workpiece than the cutting level and at which a double arc does not occur. Therefore, a smaller amount of pilot current is required for the transfer of the pilot arc into the main arc compared to the prior art and the difference between the electric resistance of the discharge path between the electrode and the nozzle and the electric resistance of the discharge path between the electrode and the workpiece can be reduced, so that the pilot arc can be smoothly transferred into the main arc. As a result, the nozzle is less susceptible to melting damage caused by the pilot arc and therefore degradation of the nozzle can be restrained and its service life can be increased. In addition, after the plasma arc has been formed between the electrode and the workpiece at the initial level, the plasma torch is relatively moved to the piercing level which is more distant from the workpiece than the initial level, while maintaining the plasma arc, and then the plasma arc is maintained with the plasma torch stopped at the piercing level until piercing is completed. With this arrangement, spatter (molten metal droplets) generated during piercing can be prevented from adhering to the nozzle so that the damage to the nozzle caused by the spatter can be avoided.

In the invention, it is preferable to cut off a pilot current by a semiconductor switch immediately after the transfer of the pilot arc into the main arc, the semiconductor switch being inserted in a line which leads to the nozzle and is disposed in a pilot current circuit for supplying a pilot current to the pilot arc. With this arrangement, the time during which the pilot current flows between the electrode and the nozzle after the transfer of the pilot arc into the main arc can be extremely shortened, so that the deterioration of the nozzle due to the pilot arc can be restrained.

BRIEF DESCRIPTION OF THE DRAWINGS

FIG. 2($a$) is a schematic structural diagram of a substantial part of the plasma cutting machine according to the embodiment and FIGS. 2($b$) to 2($f$) are diagrams illustrating a plasma arc generation circuit and its operation.

FIG. 4($a$) is a correlation diagram of pilot current verses initial level and FIG. 4($b$) is a correlation diagram of the durability of a nozzle verses pilot current.

BEST MODE FOR CARRYING OUT THE INVENTION

Referring now to the accompanying drawings, a plasma arc machining method will be described according to a preferred embodiment of the invention.

Figure 1:
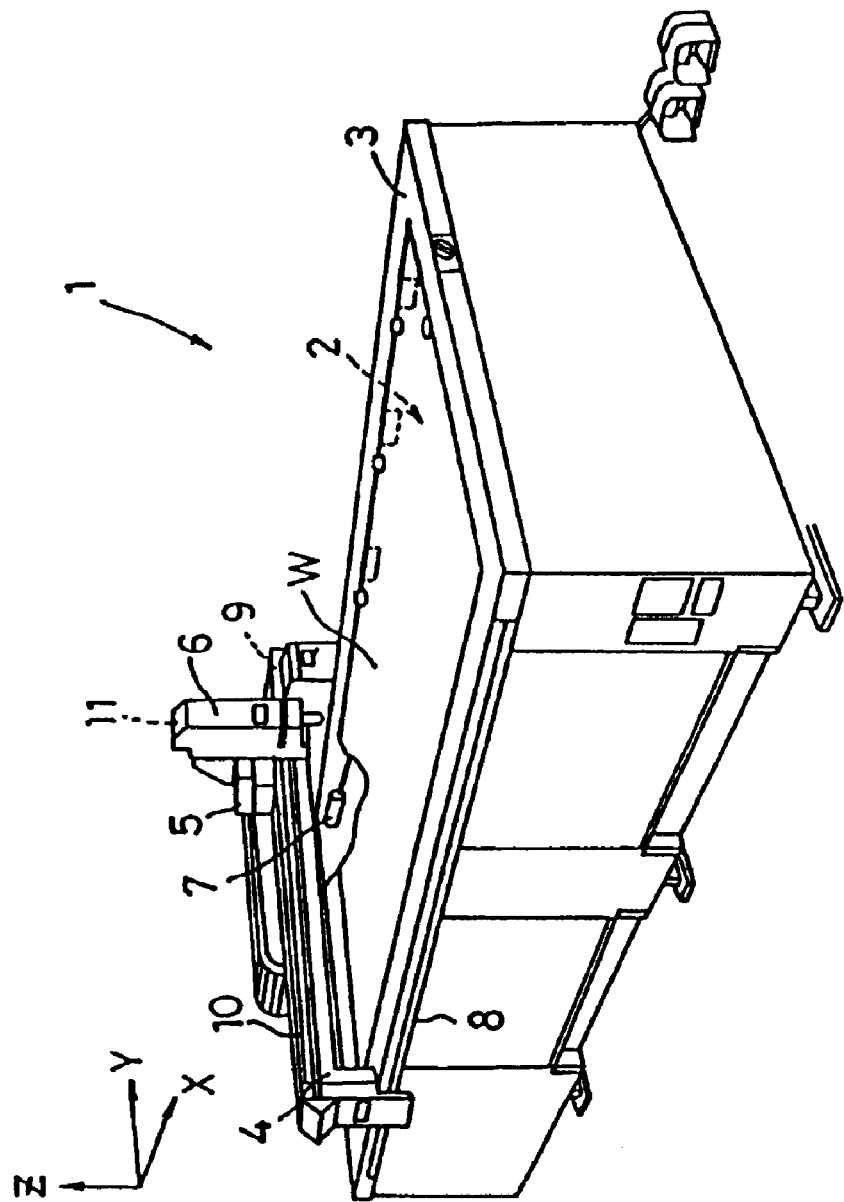
FIG. 1 is a general perspective view of a plasma cutting machine according to one embodiment of the invention.

FIG. 1 is a general perspective view of a plasma cutting machine according to the embodiment of the invention. FIG. 2($a$) is a schematic structural diagram of a substantial part of the plasma cutting machine according to the embodiment and FIGS. 2($b$) to 2($f$) are diagrams illustrating a plasma arc generation circuit and its operation.

As shown in FIG. 1, in a plasma cutting machine 1 of this embodiment, a cutting platen (cutting table) 2 for supporting a steel plate W, that is, an object material (workpiece) is disposed in the space inside a rectangular frame 3 and a portal traveling beam 4 is disposed so as to stride the frame 3. Disposed on the traveling beam 4 is a carriage 5 on which a plasma torch 6 is mounted.

The traveling beam 4 is movable by operation of an X-axis motor 7 in the direction of the X-axis along an X-axis rail 8 which extends in a longitudinal direction (i.e., the X-axis direction) of the frame 3. The carriage 5 is movable by operation of a Y-axis motor 9 in the direction of the Y axis along a Y-axis rail 10 laid on the traveling beam 4. The plasma torch 6 is movable by operation of a Z-axis motor 11 in a vertical direction (i.e., the Z-axis direction) relative to the carriage 5. By controlling each motor 7, 9, 11, the plasma torch 6 is moved to a desired position of the steel plate W and positioned at a desired level to cut the steel plate W.

As shown in FIG. 2($a$), the plasma torch 6 is substantially cylindrical in shape with its tip being tapered. The plasma torch 6 is connected to one terminal (minus terminal) of a plasma source unit 15 through a torch cable 12, a relay box 13 and a power source cable 14. The other terminal (plus terminal) of the plasma source unit 15 is connected through a parent material cable 16 to the steel plate W placed ahead of the plasma torch 6.

The plasma torch 6 has, as shown in FIG. 2($b$), a substantially cylindrical electrode 17 disposed at the center of the tip thereof and a substantially cylindrical nozzle 18 that is disposed so as to enclose the periphery of the electrode 17 and has a small-bore nozzle orifice 18a at a face (leading end face) opposed to the steel plate W. Formed between the electrode 17 and the nozzle 18 is a working gas path R. Working gas (plasma gas: oxygen is used in this embodiment) is fed from a working gas supply system (not shown) to the working gas path R through the proximal end of the nozzle 18 and jetted toward the steel plate W through the nozzle orifice 18a.

The electrode 17 of the plasma torch 6 is connected to the minus terminal of a current generator 15a of the plasma source unit 15 through a power source line 20. The power source line from the plus terminal of the current generator 15a branches out into two system lines, that is, a pilot current circuit 21 for feeding a pilot current Ip and a main current circuit 22 for feeding a main current Im. These system lines are connected to the nozzle 18 and the steel plate W, respectively.

Inserted into the power source line 20 is a high frequency generator 23. By operating the high frequency generator 23, spark discharge is caused between the electrode 17 and the nozzle 18. Reference numeral 24 of FIG. 2(b) designates a capacitor for a high frequency bypass.

In the pilot current circuit 21, there are provided a resistor 25 for smoothly transferring a pilot arc PA (see FIG. 2(d)) generated between the electrode 17 and the nozzle 18 into the main arc MA (see FIG. 2(e)) between the electrode 17 and the steel plate W; a transistor for switching (semiconductor switch) 26; and a pilot current detector 27 for detecting the pilot current Ip flowing between the electrode 17 and the nozzle 18, these resistor 25, transistor 26 and detector 27 being connected in series. In a case where the plasma cutting machine 1 is specified to have a rated pilot current value of about 20 amperes, if the resistance value of the resistor 25 is less than 2O, the current flowing into the nozzle 18 tends to enormously increase. For this reason, the resistance of the resistor 25 is preferably set to 2O or more (more preferably 4 to 8O). In this embodiment, a control command signal is input to the base of the transistor 26 from a controller (not shown). As a switching element, the transistor 26 is employed which can be operated at high speed like IGBT. For adsorbing a surge occurring at the time of switching, a surge adsorption circuit (not shown) composed of a diode or the like may be added to the pilot current circuit 21 if necessary.

Inserted in the main current circuit 22 is a main current detector 28 for detecting a flow of the main current Im between the electrode 17 and the steel plate W at the time of establishment of the main arc MA initiated by the pilot arc PA (see FIGS. 2(d) and 2(e)). In this embodiment, if a small current of about 3 amperes for example flows in the main current circuit 22, this flow is detected by the main current detector 28 and the transistor 26 of the pilot current circuit 21 is immediately turned off so that the pilot current Ip flowing between the electrode 17 and the nozzle 18 can be shut off in an instant. In this way, the time during which the pilot current Ip flows between the electrode 17 and the nozzle 18 is significantly reduced, thereby restraining the deterioration of the nozzle caused by the pilot arc.

In the plasma arc generation circuit having the above configuration, if a start-up signal is input to the plasma cutting machine 1, the current generator 15a is operated and the transistor 26 is turned on to apply d.c. current such that the electrode 17 becomes minus and the nozzle 18 and the steel plate W become plus, as shown in FIG. 2(b). At the same time, oxygen gas is supplied as a pre-flow to the working gas path R within the plasma torch 6. A pre-flow of oxygen gas is intended to completely replace air within the working gas path R with oxygen while obtaining ample time until the flow rate of the gas is stabilized. After making a pre-flow, high frequency high voltage is applied between the electrode 17 and the nozzle 18 by operation of the high frequency generator 23 as shown in FIG. 2(c) so that spark discharge is generated between the electrode 17 and the nozzle 18 to form the pilot arc PA between the electrode 17 and the nozzle 18 as shown in FIG. 2(d) with the spark working as a flash point. As a result, the pilot current Ip flows from the current generator 15a to the pilot arc PA by way of the resistor 25, the transistor 26, and the nozzle 18, and flows back to the current generator 15a from the pilot arc PA by way of the electrode 17. At that time, the current generator 15a is in a condition where it can output the maximum power, and more specifically, substantially functions as a constant voltage source, so that a drooping characteristic is given to the pilot current Ip by the resistor 25 and therefore the power source characteristics and the arc voltage are stabilized in an equilibrium condition.

When electric conduction is established between the electrode 17 and the steel plate W with the pilot arc PA serving as an initiator as shown in FIG. 2(e), part of the pilot current Ip flows to the steel plate W as the main current Im, thereby forming the main arc MA. This is detected by the main current detector 28 and the pilot current Ip flowing between the electrode 17 and the nozzle 18 is cut off by turning the transistor 26 off, so that a circuit exclusive for the main arc (plasma arc) MA such as shown in FIG. 2(f) is established and therefore, only the main current Im flows. While comparing the output value of the main current detector 28 with its setting, constant current control is performed such that a preset cut-off current value (main current Im) is maintained, and piercing and cutting operations are performed on the steel plate W.

Figure 3:
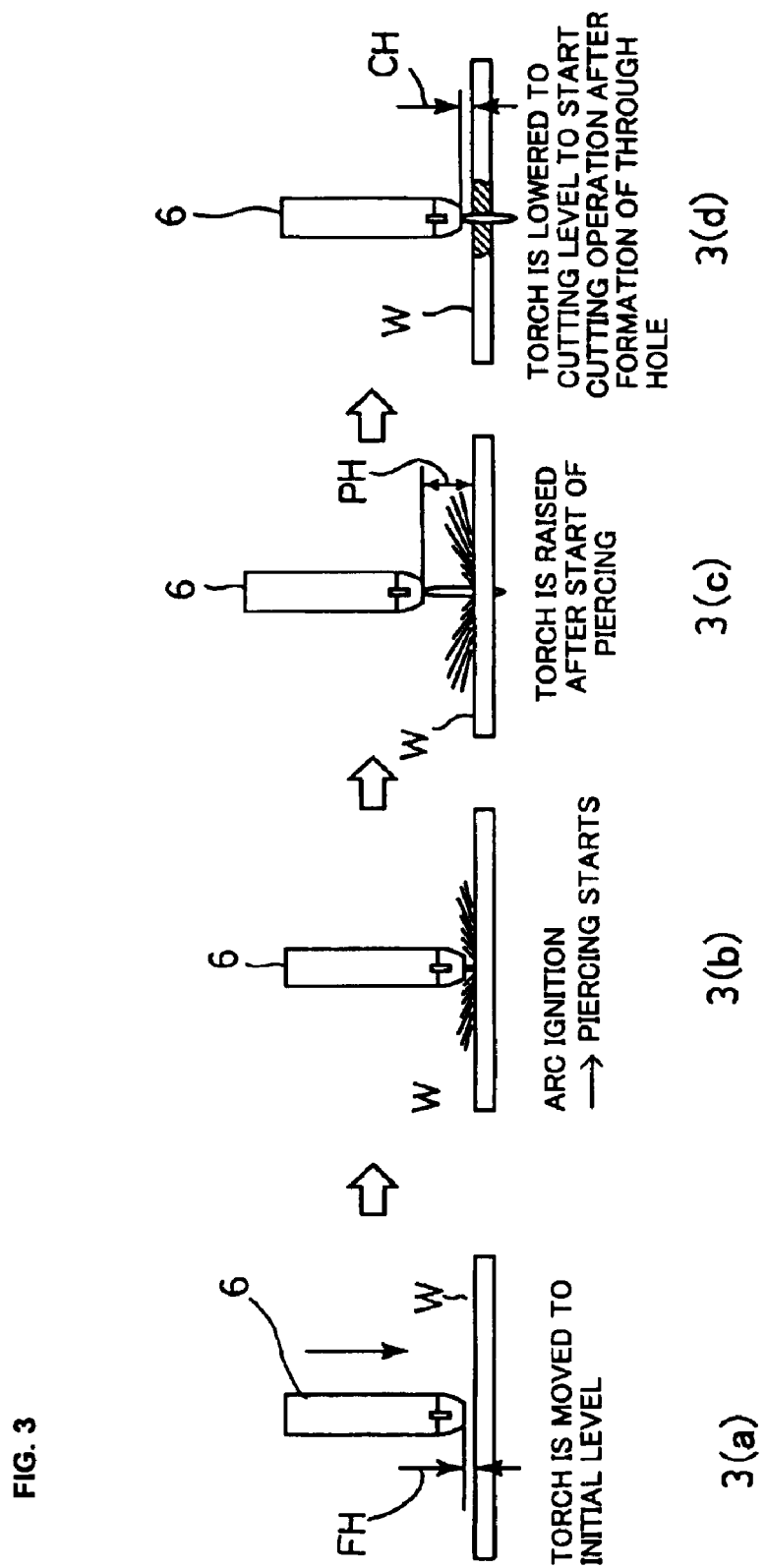
FIG. 3 is diagrams illustrating a piercing operation according to the embodiment.
Figure 5:
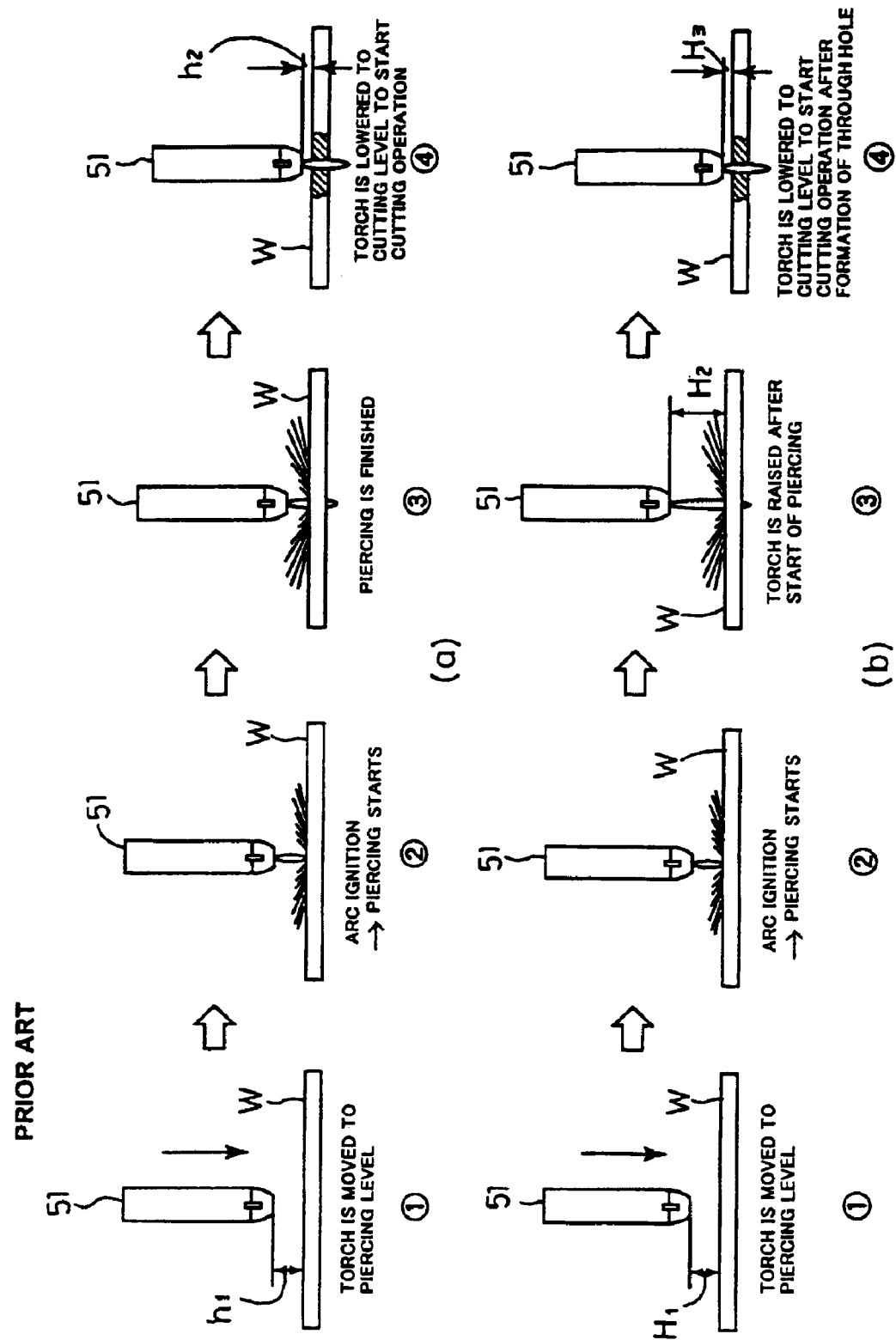
FIG. 5 is diagrams illustrating a piercing operation according to the prior art.

Next, referring to the piercing operation explanatory diagram of FIG. 3, a piercing operation, in which a through hole is formed at a cutting start position of the steel plate W by the plasma arc thus generated, will be described in the order of steps. Herein, the piercing operation is explained by way of an example in which a soft steel plate having a thickness of 19 mm is cut by "piercing start", using an oxygen plasma cutting machine having a capacity of 90 ampere output.

[Step 1: See FIG. 3(a)]

While making a pre-flow, the plasma torch 6 is moved so as to make the center of the plasma torch 6 coincident with a cutting start position (piercing position) which has been specified by an NC device (not shown) beforehand. When the center of the plasma torch 6 coincides with the piercing position, an initial level FH, that is, the distance between the plasma torch 6 and the steel plate W when a plasma arc is generated to start piercing is set to a value (3 mm) equal to a cutting level CH that is the distance between the plasma torch 6 and the steel plate W when cutting is performed, and the plasma torch 6 is positioned at the initial level FH (Step 1).

[Step 2: See FIGS. 3(b) and 3(c)]

After completion of the positioning of the plasma torch 6 in Step 1, a plasma arc is generated between the electrode 17 of the plasma torch 6 and the steel plate W. Just after the generation of a plasma arc, the plasma torch 6 is raised to a piercing level PH (15 mm) at a speed (100 mm/min.) higher than the speed at which piercing progresses in order to avoid adhesion of blown-up spatter (molten metal droplets) to the nozzle 18, while maintaining the plasma arc. Herein, the piercing level PH is a position which is more distant from the steel plate W than the initial level FH and at which the plasma torch 6 can avoid the spatter. It should be noted that the pilot current Ip for generating the plasma arc is 9A as seen from FIG. 4(a) which shows the correlation diagram of pilot current vs. the initial level.

[Step 3: See FIG. 3(c)]

From the end of Step 2 until the piercing operation is completed, the plasma arc is maintained while the plasma torch 6 being stopped at the piercing level PH. The maintaining time is about 1 sec.

[Step 4: See FIG. 3(d)]

After completion of the piercing operation in Step 3, the plasma torch 6 is lowered to the cutting level CH (=3 mm) that is the optimum level for obtaining good cut surfaces, and then cutting is started.

In the piercing operation of the present embodiment, the initial level FH is 3 mm so that the pilot current Ip is 9A as seen from FIG. 4(a) and the durability of the nozzle (the number of times firing which provides cutting quality of a certain level can be done) is about 1,000 times as seen from FIG. 4(b). In the prior art, CH is 3 mm and FH is 8 mm, so that it is understood from FIGS. 4(a) and 4(b) that Ip=24 A and the durability of the nozzle is about 300 times. The durability of the nozzle of the invention has been improved by a factor of two over the prior art.

According to the present embodiment, the damage to the nozzle 18 (which seriously affects cutting quality) not only due to spatter but also due to the pilot arc PA can be markedly reduced, thereby realizing prolongation of the service life of the nozzle. By virtue of this, not only can the running cost entailed by the replacement of the nozzle 18 be reduced but also stable cutting quality can be ensured for a long time, resulting in considerably improved workability.

Further, according to the present embodiment, the initial level can be set low irrespective of the thickness of the object material so that the transfer from the pilot arc PA to the main arc is facilitated, leading to an improvement in the reliability of ignition. It is also possible to fix the initial level irrespective of the thickness of the object material, which advantageously eliminates the need for adjustment of the pilot current Ip and leads to easy manipulation.

What is claimed is:

1. A plasma arc machining method in which a workpiece is pierced by a plasma arc and is cut from a piercing position, the plasma arc being formed by jetting plasma gas from a nozzle of a plasma torch such that the plasma arc is formed between an electrode of the plasma torch and the workpiece, said method comprising:

positioning the plasma torch at an initial height with respect to the workpiece, said initial height being less than or substantially equal to a cutting height of the plasma torch with respect to the workpiece at which a cutting operation is performed, and said initial height being at a position at which a double arc does not occur;

forming a main arc between the electrode and the workpiece by initiating a pilot arc between the electrode and the nozzle to form the main arc;

relatively moving the plasma torch and the workpiece, while maintaining the main arc, to position the plasma torch at a piercing height with respect to the workpiece to perform a piercing operation, the piercing height being larger than the initial height;

maintaining the main arc while the plasma torch is positioned at the piercing height, until completion of the piercing operation; and relatively moving the plasma torch and the workpiece to position the plasma torch at the cutting height to perform the cutting operation, after the completion of the piercing operation.

2. The plasma arc machining method according to claim 1, wherein a semiconductor switch is provided in a pilot current circuit in a line that leads to the nozzle to supply a pilot current, and wherein the pilot current is cut off by the semiconductor switch immediately after transfer of the pilot arc into the main arc.

* * * * *